(12) United States Patent
Swantner et al.

(10) Patent No.: US 7,114,687 B2
(45) Date of Patent: Oct. 3, 2006

(54) SNAP-ON CABLE RETAINER

(75) Inventors: Michael J. Swantner, Warren, PA (US); Douglas G. Seymour, York, PA (US); Randall E. Gillotti, Warren, PA (US)

(73) Assignee: Osram Sylvania Inc., Danvers, MA (US)

( * ) Notice: Subject to any disclaimer, the term of this patent is extended or adjusted under 35 U.S.C. 154(b) by 57 days.

(21) Appl. No.: 10/974,927

(22) Filed: Oct. 26, 2004

(65) Prior Publication Data

US 2006/0086866 A1 Apr. 27, 2006

(51) Int. Cl.
*F16L 3/08* (2006.01)
(52) U.S. Cl. ............................. 248/74.2; 248/73; 24/459
(58) Field of Classification Search .................. 248/65, 248/70, 71, 74.2, 74.4, 74.5, 73; 174/545, 174/50; 24/459
See application file for complete search history.

(56) References Cited

U.S. PATENT DOCUMENTS

| | | | | |
|---|---|---|---|---|
| 4,936,530 A | * | 6/1990 | Wollar | 248/71 |
| 5,584,212 A | * | 12/1996 | Wild | 74/502.6 |
| 6,595,473 B1 | * | 7/2003 | Aoki et al. | 248/74.4 |
| 6,668,865 B1 | * | 12/2003 | Miyamoto et al. | 138/108 |
| 6,717,055 B1 | * | 4/2004 | Kato | 174/72 A |

FOREIGN PATENT DOCUMENTS

FR 2572488 A1 * 5/1986 ........................ 3/12

* cited by examiner

Primary Examiner—A. Joseph Wujciak, III
(74) Attorney, Agent, or Firm—William H. McNeill

(57) ABSTRACT

A cable retainer (10) for a cable (12) having a longitudinal axis (11) and a given diameter has a first elongated body half (14) arrayed along the longitudinal axis (11) and having a first surface (18) and a second, oppositely disposed surface (20), the second oppositely disposed surface (20) having a first cable receiving section (22) therein with a depth at least one half of the given diameter. A second elongated body half (30) is arrayed along the longitudinal axis (11) and has a first area (34) and a second, oppositely disposed area (36) with a second cable receiving section (38) therein. A guide system (37) is provided for orienting the first elongated body half and the second elongated body half. A fastener (40) is formed on the second elongated body half (30) and a receptor (42) for the fastener (40) is formed on the first elongated body half (14). A plurality of cable-engaging projections (44) is formed in each of the first cable receiving section (22) and the second cable receiving section (38), the cable engaging projections (44) in the first cable-receiving section (22) being longitudinally displaced from the projections (44) in the second cable receiving section (38), whereby an inserted cable (12) is rendered axially and rotationally stable.

3 Claims, 4 Drawing Sheets

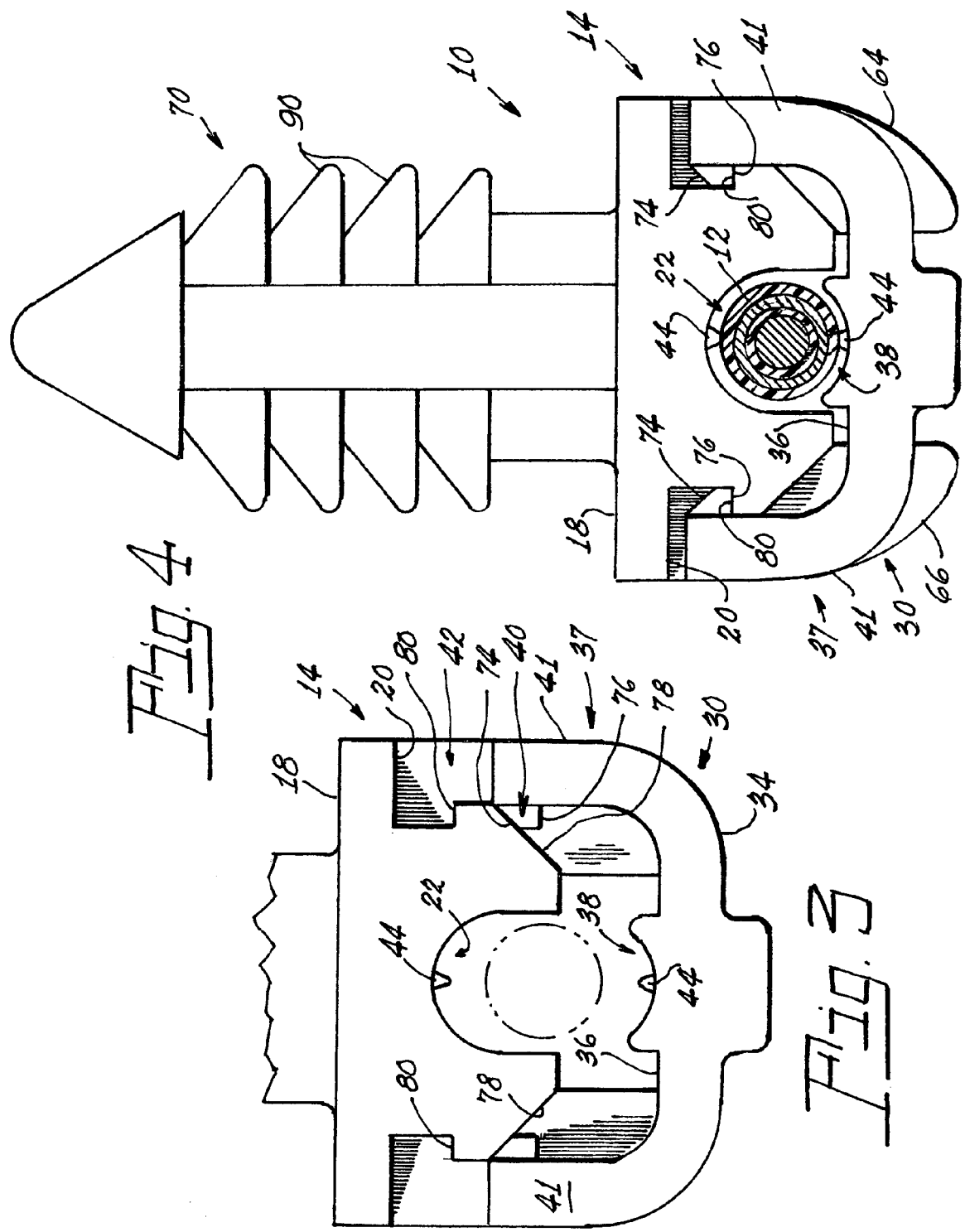

SNAP-ON CABLE RETAINER

TECHNICAL FIELD

This invention relates to cable locators and more particularly to a cable locator that can be quickly attached to a cable.

BACKGROUND ART

Cable locators known in the art usually comprise a soft molded component having a base with a cable locator integrally formed as a part thereof. After proper positioning, the cable locator was attached to a cable by winding tape around the base. This procedure required elaborate jigging stations if the cable employing the cable locators was to be used, for example, as the antenna cable for an automobile. An alternate system is disclosed in U.S. Pat. No. 5,601,262, wherein a cable locator utilizes a two-part connector that includes a base for receiving a cable and a cover for locking the base to the cable. This system had numerous advantages over the taping system, particularly in the speed of applying the locator; however, it has been found that system did not adequately restrain the cable from rotational or longitudinal movement and it was relatively expensive to produce.

DISCLOSURE OF INVENTION

It is, therefore, an object of the invention to obviate the disadvantages of the prior art.

It is another object of the invention to enhance cable locators.

Yet another object of the invention is the provision of a cable locator that truly restricts rotational and longitudinal movement of a captured cable.

These objects are accomplished, in one aspect of the invention, by a cable retainer for a cable having a longitudinal axis and a given diameter comprising: a first elongated body half with a longitudinal axis and having a first surface and a second, oppositely disposed surfaces, said second oppositely disposed surface having a first cable receiving section therein, said first cable receiving section having a depth at least one half of said given diameter; a second elongated body half with a longitudinal axis and having a first area and a second, oppositely disposed area having a second cable receiving section therein; a fastener formed on said second elongated body half; a receptor for said fastener formed on said first elongated body half; and a plurality of cable-engaging projections formed in each of said first cable receiving section and said second cable receiving section, the cable engaging projections in said first cable-receiving section being longitudinally displaced from the projections in the second cable receiving section, whereby an inserted cable is rendered axially and rotationally stable.

BRIEF DESCRIPTION OF THE DRAWINGS

FIG. 3 is an elevation view of the two retainer parts before assembly is completed;

FIG. 4 is a similar view after the assembly of the two parts is completed;

BEST MODE FOR CARRYING OUT THE INVENTION

For a better understanding of the present invention, together with other and further objects, advantages and capabilities thereof, reference is made to the following disclosure and appended claims taken in conjunction with the above-described drawings.

Figure 1:
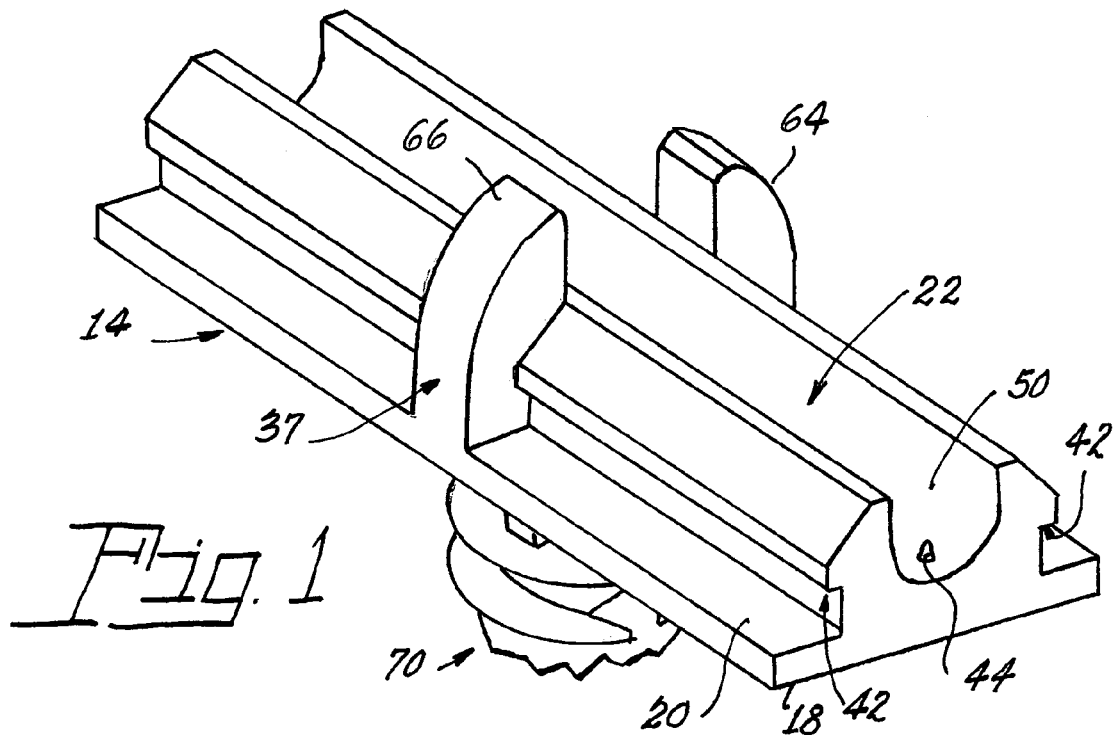
FIG. 1 is a perspective view of a first part of a cable retainer in accordance with an aspect of the invention.

Referring now to the drawings with greater particularity, a cable retainer 10 for a cable 12 having a longitudinal axis 11 and a given diameter is shown in FIG. 4. A first elongated body half 14 (see FIG. 1) has a first surface 18 and a second, oppositely disposed surface 20. The second oppositely disposed surface 20 has a first cable receiving section 22 therein. The first cable receiving section 22 has a depth at least one half of the given diameter and in a preferred embodiment of the invention takes the form of a groove 50 that is arcuate in cross-section to substantially conform to the configuration of the cable 12.

Figure 2:
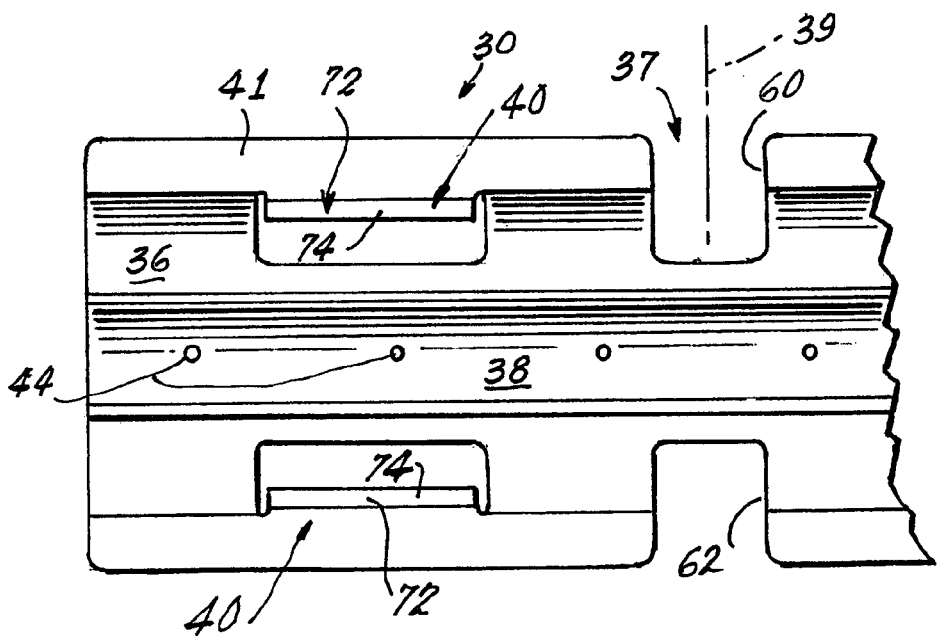
FIG. 2 is a partial plan view of a second part of a cable retainer.

A second elongated body half 30 (see FIGS. 2 and 3) has a first area 34 and a second, oppositely disposed area 36 having a second cable receiving section 38 therein. The cable receiving section 38 also has a preferably arcuate configuration. As represented in FIG. 2 it is to be understood that the second elongated body half is symmetrical about the centerline 39.

A guide system 37 is formed for cooperation between the two halves and comprises spaced apart slots 60, 62 formed on opposite sides of the second elongated body half 30 and fingers 64, 66 formed on the first elongated body half 14. When the halves are mated the cooperation between the slots and fingers prevents longitudinal movement of the halves relative to one another along the longitudinal axis 11.

A fastener 40 is formed on the second elongated body half 30 and a receptor 42 for the fastener 40 is formed on the first elongated body half 14.

In a preferred embodiment of the invention, the fastener 40 comprises a projection 72 having an angled face 74 and a rim 76. The fastener 40 can be formed on an upstanding wall 41 of the second elongated body half 30. The receptor 42 on first elongated body half 14 comprises a matching angled face 78 and a ledge 80. The body halves are shown in an unmated position in FIG. 3 with a cable 12 in phantom and in the mated position in FIG. 4. The flexibility of the arms 41 allows them to digress outwardly as the halves are pushed together until the fasteners 40 engage the receptors 42.

Figure 5:
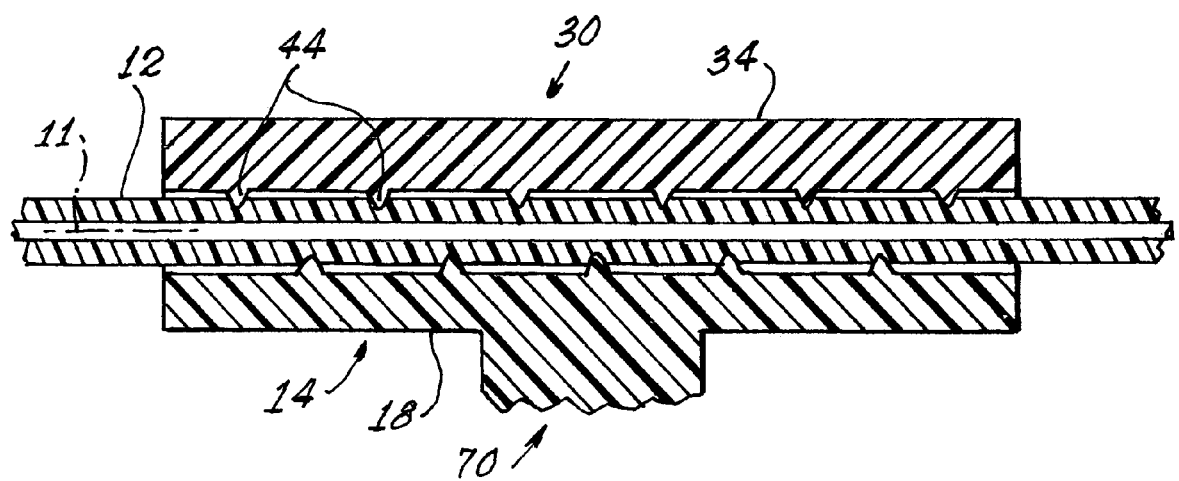
FIG. 5 is a longitudinal sectional view of the retainer and its mounted cable with the grounding braid of the cable omitted for clarity.

A plurality of cable-engaging projections 44 is formed in each of the first cable receiving section 22 and the second cable receiving section 38. The cable engaging projections 44 in the first cable-receiving section 22 are longitudinally displaced from the projections 44 in the second cable receiving section 38 (see FIG. 5), whereby an inserted cable is rendered axially and rotationally stable, since the projections 44, which are conically shaped with a spherical tip, will penetrate the relatively soft insulation outer layer of the cable.

Figure 6:
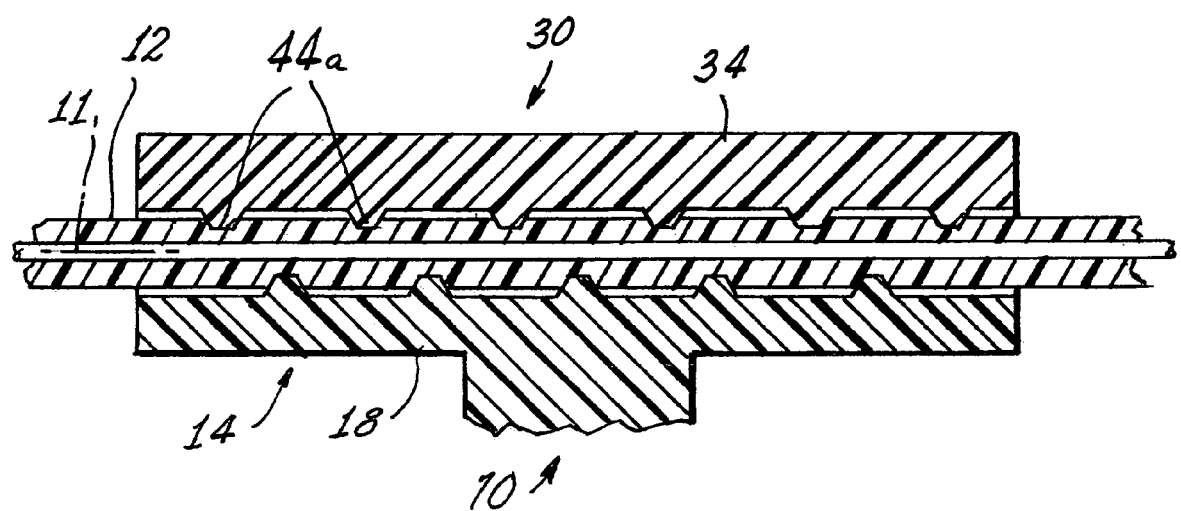
FIG. 6 is a view similar to FIG. 5 of an alternate embodiment.

In an alternate embodiment, shown in FIG. 6, projections 44a are provided with a flat cable-engaging portion. As noted above, in FIGS. 5 and 6 the ground braid of the coaxial cable has been omitted for clarity.

At least one of the first elongated body half 14 or the second elongated body half 30 has a cable locator 70 associated therewith. In the illustrated embodiment the cable locator is formed on the first elongated body half 14 and takes the form of a number of resilient cone like members 90, which can be inserted into an appropriate mounting aperture, thereby fixing the location of the cable.

While any number of relatively resilient materials can be employed in the manufacture of the cable retainer, in a preferred embodiment the elongated body half that carries the cable locator 70 is formed from nylon while the opposite elongated body half is formed from polypropylene.

The cable retainer herein described has many advantages over the prior art. Relative to the oldest versions, the need for taping is eliminated. Relative to newer versions, such as shown and described in the above-mention U.S. Pat. No. 5,601,262 the potentially breakable cover is eliminated from one form and the slidable body half of the other described form is also eliminated. The snap-together feature of the instant invention provides a firm connection and resists any movement of the body halves relative to one another due to the guide system incorporated between the halves and provides superior retention of the cable.

While there have been shown and described what are present considered to be the preferred embodiments of the invention, it will be apparent to those skilled in the art that various changes and modifications can be made herein without departing from the scope of the invention as defined by the appended claims.

What is claimed is:

1. A cable retainer for a cable having a longitudinal axis and a given diameter comprising:

a first elongated body half having a first surface and a second, oppositely disposed surface, said second oppositely disposed surface having a first cable receiving section therein, said first cable receiving section having a depth at least one half of said given diameter;

a second elongated body half having a first area and a second, oppositely disposed area having a second cable receiving section therein;

a guide system for orienting said first elongated body half and said second elongated body half, said guide system comprising a pair of spaced-apart slots formed on opposite sides of said second body half and a pair of fingers formed on said first body half and formed to engage said spaced-apart slots, whereby relative movement between said first elongated body half and said second elongated body half along said longitudinal axis is substantially prevented;

a fastener formed on said second elongated body half;

a reception defining a longitudinal slot in second surface of said first elongated body half for receiving said fastener; and a plurality of cable-engaging projections formed in each of said first cable receiving section and said second cable receiving section, the cable engaging projections in said first cable-receiving section being longitudinally displaced from the projections in the second cable receiving section, whereby an inserted cable is rendered axially and rotationally stable.

2. The cable retainer of claim 1 wherein said first cable receiving section is in the form of a groove.

3. The cable retainer of claim 2 wherein said groove is arcuate in cross-section.

\* \* \* \* \*